United States Patent [19]

Kobayashi et al.

[11] Patent Number: 4,544,602
[45] Date of Patent: Oct. 1, 1985

[54] MAGNETO-OPTICAL RECORDING MEDIUM HAVING A FERRIMAGNETIC RECORDING LAYER

[75] Inventors: Hiroshi Kobayashi; Hazime Machida, both of Tokyo; Motoharu Tanaka, Numazu, all of Japan

[73] Assignee: Ricoh Company, Ltd., Tokyo, Japan

[21] Appl. No.: 590,140

[22] Filed: Mar. 16, 1984

[30] Foreign Application Priority Data

Mar. 17, 1983 [JP] Japan ................................ 58-43232

[51] Int. Cl.$^4$ ............................................. G11B 11/10
[52] U.S. Cl. .................................... 428/336; 365/122; 428/694; 428/699; 428/701; 428/702; 428/900
[58] Field of Search ............... 252/52.56, 62.57, 62.58, 252/62.59; 365/122; 428/692, 336, 694, 900, 699, 702, 701

[56] References Cited

U.S. PATENT DOCUMENTS 3,770,639 11/1973 Okazaki et al. ................... 252/62.58
4,390,600 6/1983 Ohta et al. ............................ 428/621
4,414,650 11/1983 Ohta et al. ............................ 365/122

FOREIGN PATENT DOCUMENTS 0024834 11/1968 Japan .
0002225 1/1983 Japan .

OTHER PUBLICATIONS

Mat. Res. Bull., vol. 16, No. 12, (Dec.), pp. 1499–1504, Pollert et al., "Preparation and Characterization of $PbFe_{12-x} Ga_x O_{19}$ Single Crystals".

Primary Examiner—George F. Lesmes
Assistant Examiner—William M. Atkinson
Attorney, Agent, or Firm—Flynn, Thiel, Boutell & Tanis

[57] ABSTRACT

A magneto-optical recording medium is disclosed, which comprises a transparent substrate, a vertical magnetic-anisotropic magnetic film layer formed thereon, which magnetic film layer comprises a ferrimagnetic oxide of the following formula $$MeGa_xFe_{12-x}O_{19}$$

wherein Me represents an element selected from the group consisting of Ba, Sr and Pb, and x is an integer of 3 to 8, and a reflection layer formed on the vertical magnetic-anisotropic film layer.

7 Claims, 2 Drawing Figures

$BaGa_xFe_{12-x}O_{19}$

MAGNETO-OPTICAL RECORDING MEDIUM HAVING A FERRIMAGNETIC RECORDING LAYER

BACKGROUND OF THE INVENTION

The present invention relates to a magneto-optical recording medium including a vertical magnetic-anisotropic magnetic film layer comprising a ferrimagnetic oxide which is not deteriorated by oxidation, allowing recording of information or data and reproducing the same by application of laser beams.

Conventionally, many magneto-optical recording mediums for recording and reproducing information by application of laser beams thereto have been proposed, which comprise amorphous magnetic alloy films consisting of alloys of transition metals such as Fe and Co and heavy rare earth metals such as Tb, Gd and Dy. However, in these amorphous magnetic alloy films, the heavy earth metals are so easily oxidized that, in the presence of water, the magnetic characteristics of the magnetic alloy films are considerably deteriorated due to the oxidization thereof. In order to prevent such deterioration of the magnetic alloy films, there has been proposed a protective layer for protecting the magnetic alloy films, which protective layer comprises an oxide such as $SiO_2$, SiO and $TiO_2$, or a nitride such as TiN and SiN. Such protective layer has to be free from pin holes. However, it is extremely difficult to prepare a protective layer without any pin holes.

Furthermore, when producing a magnetic film layer comprising a substrate and a magnetic film formed thereon, a large amount of oxygen contained in the chamber for producing the magnetic film is adsorbed at the interface between the substrate and the magnetic film layer, and the adsorbed oxygen reacts with the heavy rare earth metal contained in the magnetic film, forming a heavy rare earth metal oxide, by which the magnetic film is considerably deteriorated.

At the time of recording, the recording medium is heated for a long period of time, and by the application of heat, the magnetic characteristics of the recording medium are deteriorated with time. Due to the above-mentioned adverse factors, it is difficult to produce a magneto-optical recording medium comprising a magnetic layer consisting of a transition metal—heavy rare earth metal alloy that can be used for 10 years or more.

In order to prevent the oxidization of the magnetic layer, an anti-oxidation layer is necessary, but the use of an anti-oxidization layer not always practical in the production of the recording medium, because the layer structure of the recording medium becomes complex if an anti-oxidation layer is included, and the production of the recording medium becomes difficult.

When plastics are employed as the materials for the substrate of the recording medium, a technique for eliminating the moisture-penetration properties of the plastics is required.

A hexagonal-system M-type ferrite has been investigated for use as a magnetic bubble material as being a magnetic material free from deterioration by oxidation. This material, however, has a curie temperature as high as 450° C. or more. Therefore, it cannot be used as a magneto-optical recording material for recording by application of laser beams thereto.

SUMMARY OF THE INVENTION

It is therefore an object of the present invention to provide a magneto-optical recording medium comprising a vertical magnetic-anisotropic magnetic film layer comprising a ferrimagnetic oxide which is not oxidized, not corroded, and not deteriorated in the magnetic properties, which is capable of recording and reproducing information by application of laser beams thereto.

Another object of the present invention is to provide a magneto-optical recording medium of the above-mentioned type, having a sufficiently low curie temperature and appropriate magnetic characteristics, such as Ms (saturation magnetization) and Hc (intrinsic coercive force), for the recording and reproduction of information by application of laser beams.

According to the present invention, the above objects can be attained by a magneto-optical recording medium comprising a transparent substrate, a vertical magnetic-anisotropic magnetic film layer formed thereon, which magnetic film layer comprises a ferrimagnetic oxide of the following formula:

$$MeGa_xFe_{12-x}O_{19}$$

wherein Me represents an element selected from the group consisting of Ba, Sr and Pb, and x is an integer of 3 to 8, and a reflection layer formed on the vertical magnetic-anisotropic magnetic film layer.

In the ferrimagnetic oxides for use in the present invention, since the ionic radius of Ga by which part of Fe atoms are replaced is nearly equal to the ionic radius of Fe, Ga is easily incorporated in the ferrimagnetic oxides, and it is considered that by the incorporation of Ga atoms, the super exchange interaction of the Fe atoms in the ferrimagnetic oxides is decreased, whereby the curie temperature thereof is appropriately lowered for the recording and reproduction by laser beams.

It is particularly preferable that, in the above formula, x be 4 or more, since when x is 4 or more, the curie temperature is 220° C. or less.

Furthermore, in the magnetic properties of the magento-optical recording medium according to the present invention, Ms is in the range of 30 emu/cc to 300 emu/cc and Hc is in the range of 0.5 KOe to 10 KOe, which magnetic properties satisfy the necessary properties of the magnetic recording films for recording and reproducing by application of laser beams.

DETAILED DESCRIPTION OF THE PREFERRED EMBODIMENTS

Referring to the accompanying drawings, the present invention will now be explained in detail.

Figure 1:
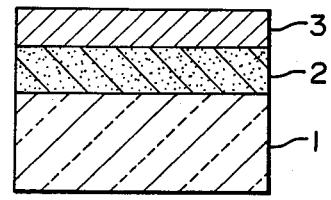
FIG. 1 is a schematic cross-sectional view of an embodiment of a magneto-optical recording medium according to the present invention.
Figure 2:
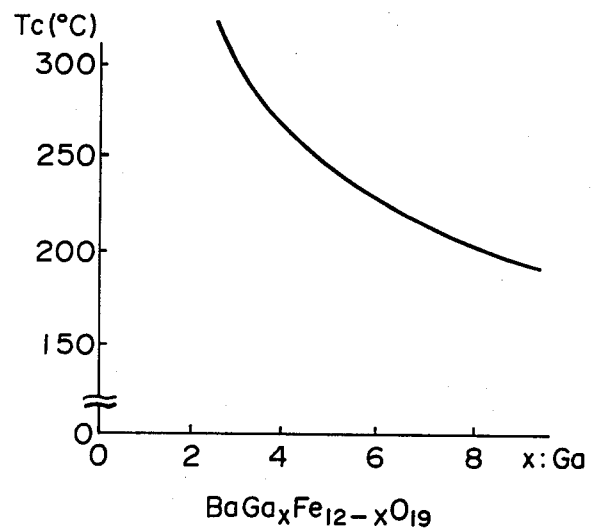
FIG. 2 is a diagram showing the relationship between the content ratio x of Ga atoms in the ferrimagnetic oxides for use in the present invention and the curie temperature thereof.

FIG. 1 shows schematically the cross section of a representative embodiment of a magneto-optical recording medium according to the present invention. As shown in the figure, the magneto-optical recording medium according to the present invention comprises a transparent substrate 1, a magnetic film layer 2 formed thereon and a reflection film layer 3 formed on the magnetic film layer 2.

As the material for the transparent substrate 1, quartz glass, crystallized glass, Gallium-Garnet-Gadolinium (hereinafter referred to as GGG) and transparent ceramics can be employed.

It is preferable that the thickness of the magnetic film layer 2 comprising a ferrimagnetic oxide of the formula, $MeGa_xFe_{12-x}O_{19}$, wherein Me represents an element selected from the group consisting of Ba, Sr and Pb, and x is an integer of 3 to 8, be in the range of about 1,000 Å to 100,000 Å, more preferably in the range of 3,000 Å to 30,000 Å.

As the material for the reflection layer 3, for example, Al, Cr, Cu, Pt, Au and Ag can be employed. It is preferable that the thickness of the reflection layer 3 be in the range of 500 Å to 10,000 Å. When necessary, a protective layer can be formed on the reflection layer 3. The protective layer can be made of, for example, $SiO_2$, SiO, $TiO_2$, TiN, $Si_3N_4$, TaN, CrN, AlN or plastics.

In order to improve the magneto-optical characteristics of the magnetic film layer 2, at least one element selected from the group consisting of Bi, Gd, V, Co, Tb, Dy, Y, La, Sm and Ge can be added thereto.

The magnetic film layer 2 can be formed on the transparent substrate 1 by depositing the ferrimagnetic oxide of the above-mentioned formula by the sputtering method, the evaporation method or the ion-plating method.

When necessary, there can be interposed an adhesive layer between the magnetic film layer 2 and the reflection layer 3.

Further, in order to improve the vertical magnetic-anisotropic properties of the ferremagnetic oxides for use in the present invention, there can be formed a layer of ZnO, $\alpha\text{-}Fe_2O_3$, $\alpha\text{-}Al_2O_3$, AlN, $SiO_2$, MgO or MnZn-ferrite between the transparent substrate and the magnetic film layer.

Referring to the following examples, embodiments of a magneto-optical recording medium according to the present invention will now be explained in detail.

EXAMPLE 1

$SiO_2$ was first deposited with a thickness of 1,000 Å on a GGG substrate by sputtering.

A magnetic film layer with a thickness of 10,000 Å was then deposited by sputtering on the $SiO_2$-deposited substrate, with the temperature of the substrate raised to 550° C., from a target consisting of $BaGa_3Fe_9O_{19}$.

On the thus formed magnetic film, there was formed a reflection layer of Al with a thickness of 5,000 Å, whereby a magneto-optical recording medium No. 1 according to the present invention was prepared.

The magnetic properties of the recording medium No. 1 were as follows:
Ms=100 emu/cc, Hc=4.5 KOe, and Tc=290° C.

A magnetic field of 10 KOe was applied to the recording medium No. 1, so that the recording medium was totally magnetized in one magnetization direction. Thereafter a magnetic field of 0.5 KOe with a magnetization direction opposite to the above-mentioned magnetization direction was applied to the thus magnetized recording medium, while applying thereto laser beams with an output power of 10 mW, whereby recording was performed on the recording medium No. 1, with the initial magnetization direction reversed.

The recording medium No. 1 was stored at a temperature of 100° C. for 7 days. No deterioration of the magnetic properties was observed by the storage.

For comparison, a comparative recording medium was prepared in the same manner as described above except that the above magnetic film layer was replaced by a magnetic film layer of an amorphous magnetic alloy with a thickness of 1,000 Å deposited from a target of $Tb_{0.24}Fe_{0.76}$. In the case of this comparative recording medium, the magnetic layer was oxidized, and the crystallization of the magnetic layer took place during the above-mentioned storage, so that the magnetic properties of the recording medium were considerably deteriorated as follows:

|  | $BaGa_3Fe_9O_{19}$ | $Tb_{0.24}Fe_{0.76}$ |
|---|---|---|
| Initial | $2\theta_F = 1.2$ deg. | $2\theta_K = 0.7$ deg. |
| After 7-day Storage | $2\theta_F = 1.1$ deg. | $2\theta_K = 0.32$ deg. |

Note:
$\theta_F$ = Faraday Rotation Angle
$\theta_K$ = Polar Kerr Rotation Angle
The above were the data of a portion of each magnetic film layer on the side of the substrate.

EXAMPLE 2

Example 1 was repeated except that the target of $BaGa_3Fe_9O_{19}$ employed in Example 1 was replaced with a target of $BaGa_5Fe_7O_{19}$, whereby a magneto-optical recording medium No. 2 according to the present invention was prepared.

The magnetic properties of the recording medium No. 2 were excellent as follows:
Ms=70 emu/cc, Hc=5.0 KOe, and Tc=240° C.

With this recording medium, almost the same results as in Example 1 were obtained with respect to the Faraday rotation angle thereof in the storage test.

EXAMPLE 3

Example 1 was repeated except that the target of $BaGa_3Fe_9O_{19}$ employed in Example 1 was replaced with a target of $SrGa_4Fe_8O_{19}$, whereby a magneto-optical recording medium No. 3 according to the present invention was prepared.

The magnetic properties of the recording medium No. 3 were excellent as follows:
Ms=60 emu/cc, Hc=6.5 KOe, and Tc=250° C.

With this recording medium, almost the same results as in Example 1 were obtained with respect to the Faraday rotation angle thereof in the storage test.

EXAMPLE 4

Example 1 was repeated except that the target of $BaGa_3Fe_9O_{19}$ employed in Example 1 was replaced with a target of $PbGa_3Fe_9O_{19}$, whereby a magneto-optical recording medium No. 4 according to the present invention was prepared.

The magnetic properties of the recording medium No. 4 were excellent as follows:
Ms=50 emu/cc, Hc=4.0 KOe, and Tc=260° C.

With this recording medium, almost the same results as in Example 1 were obtained with respect to the Faraday rotation angle thereof in the storage test.

EXAMPLE 5

$SiO_2$ was first deposited with a thickness of 1,000 Å on a substrate of crystallized glass (commercially available from N.G.K. Insulator Co., Ltd., under a commercial name of Miraclon) by sputtering. On this SiO$_2$-deposited substrate, a C-axis orientation film of ZnO was deposited with a thickness of 1,000 Å, followed by deposition thereon of a vertical magnetic-anisotropic magnetic film layer with a thickness of 10,000 Å from a target of a sintered magnetic alloy of BaGa$_3$BiFe$_8$O$_{19}$ by sputtering, with the temperature of the substrate maintained at 570° C.

On the thus formed magnetic film layer, there was further formed a reflection layer of Au with a thickness of 500 Å, whereby a magneto-optical recording medium No. 5 according to the present invention was prepared.

The magnetic properties of the recording medium No. 5 were excellent as follows:
Ms=60 emu/cc, Hc=2.0 KOe, and Tc=280° C.

A magnetic field of 10 KOe was applied to the recording medium No. 5, so that the recording medium was totally magnetized in one magnetization direction. Thereafter, a magnetic field of 0.5 KOe with a magnetization direction opposite to the above-mentioned magnetization direction was applied to the thus magnetized recording medium, while applying thereto laser beams with an output power of 10 mW, whereby recording was performed on the recording medium No. 5, with the initial magnetization direction reversed.

The same storage test as in Example 1 was performed. The results were the initial $2\theta_F$ was 1.5 deg. and $2\theta_F$ after the 7-day storage was 1.2 deg.

EXAMPLE 6

Example 5 was repeated except that the target of the sintered magnetic alloy of BaGa$_3$BiFe$_8$O$_{19}$ employed in Example 5 was replaced with a target of BaGa$_4$BiFe$_7$O$_{19}$, whereby a magneto-optical recording medium No. 6 according to the present invention was prepared.

The magnetic properties of the recording medium No. 6 were excellent as follows:
Ms=30 emu/cc, Hc=3.0 KOe, and Tc=240° C.

The same storage test as in Example 1 was performed. The results were the initial $2\theta_F$ was 1.3 deg. and $2\theta_F$ after the 7-day storage was 1.2 deg.

EXAMPLE 7

Example 5 was repeated except that the SiO$_2$ deposited on the crystallized glass substrate in Example 5 was replaced with AlN, and the target of a sintered magnetic alloy of BaGa$_3$BiFe$_8$O$_{19}$ employed in Example 5 was replaced with a target of BaGa$_3$CoBiFe$_7$O$_{19}$, whereby a magneto-optical recording medium No. 7 according to the present invention was prepared.

The magnetic properties of the recording medium No. 7 were excellent as follows:
Ms=80 emu/cc, Hc=2.5 KOe, and Tc=290° C.

The same storage test as in Example 1 was performed. The results were the initial $2\theta_F$ was 1.6 deg. and $2\theta_F$ after the 7-day storage was 1.4 deg.

The thus prepared magneto-optical recording mediums according to the present invention are more resistant to oxidation and stabler and exceedingly better in the magnetic properties as compared with the conventional magneto-optical recording mediums.

What is claimed is:

1. A magneto-optical recording medium comprising a transparent substrate, a vertical magnetic-anisotropic magnetic film layer formed thereon, which magnetic film layer comprises a ferrimagnetic oxide of the following formula:

$$MeGa_xFe_{12-x}O_{19}$$

wherein Me represents an element selected from the group consisting of Ba, Sr and Pb, and x is an integer of 3 to 8, and a reflection layer formed on said vertical magnetic-anisotropic magnetic film layer.

2. A magneto-optical recording medium as claimed in claim 1, wherein said reflection layer comprises at least one element selected from the group consisting of Al, Cr, Cu, Ag, Pt and Au.

3. A magneto-optical recording medium as claimed in claim 1, further comprising a protective layer formed on said reflection layer.

4. A magneto-optical recording medium as claimed in claim 1, wherein said magnetic film layer further comprises at least one element selected from the group consisting of Sm and V.

5. A magneto-optical recording medium as claimed in claim 1, wherein said transparent substrate is made of at least one material selected from the group consisting of quartz glass, crystallized glass and transparent ceramics.

6. A magneto-optical recording medium as claimed in claim 1, wherein the thickness of said magnetic film layer is in the range of about 1,000 Å to 100,000 Å.

7. A magneto-optical recording medium as claimed in claim 1, wherein the thickness of said reflection layer is in the range of about 500 Å to 10,000 Å.

* * * * *